United States Patent
Pal

(10) Patent No.: US 9,413,208 B2
(45) Date of Patent: Aug. 9, 2016

(54) ENHANCED COOLING OF ENCLOSED AIR COOLED HIGH POWER MOTORS

(71) Applicant: Hamilton Sundstrand Corporation, Windsor Locks, CT (US)

(72) Inventor: Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 375 days.

(21) Appl. No.: 13/736,523

(22) Filed: Jan. 8, 2013

(65) Prior Publication Data
US 2014/0191597 A1 Jul. 10, 2014

(51) Int. Cl.
*H02K 9/08* (2006.01)
*H02K 9/18* (2006.01)

(52) U.S. Cl.
CPC ... *H02K 9/08* (2013.01); *H02K 9/18* (2013.01)

(58) Field of Classification Search
CPC .................................. H02K 9/08; H02K 9/18
USPC ..................................................... 310/62, 64
See application file for complete search history.

(56) References Cited

U.S. PATENT DOCUMENTS

| | | | | |
|---|---|---|---|---|
| 2,630,676 A * | 3/1953 | Seifert | ......................... | 60/39.35 |
| 3,916,231 A * | 10/1975 | Cathey | ..................... | H02K 9/10 219/209 |
| 4,217,513 A * | 8/1980 | Kohzai | .................... | H02K 23/04 310/154.43 |
| 4,240,000 A * | 12/1980 | Harano | ..................... | H02K 9/20 165/104.25 |
| 5,698,238 A | 12/1997 | Fabbri | | |
| 6,078,115 A | 6/2000 | Uchida et al. | | |
| 6,774,514 B2 | 8/2004 | Matsuoka et al. | | |
| 8,053,938 B2 | 11/2011 | Pal et al. | | |
| 8,232,692 B2 | 7/2012 | Yoshimura et al. | | |
| 2004/0118363 A1* | 6/2004 | Cardenas et al. | .......... | 123/41.66 |
| 2004/0263008 A1* | 12/2004 | Voigt et al. | ....................... | 310/58 |
| 2007/0273220 A1* | 11/2007 | Koyama et al. | .................. | 310/58 |
| 2007/0273221 A1* | 11/2007 | Kinoshita et al. | ............... | 310/58 |
| 2007/0284954 A1* | 12/2007 | Lin et al. | .......................... | 310/58 |
| 2009/0074338 A1* | 3/2009 | Hagshenas et al. | ........... | 384/428 |
| 2009/0230791 A1* | 9/2009 | Scharfenberg et al. | ......... | 310/62 |
| 2011/0037330 A1* | 2/2011 | Dutau | ............................. | 310/62 |
| 2011/0101803 A1* | 5/2011 | Hayashi | .......................... | 310/62 |
| 2011/0109176 A1* | 5/2011 | Yoshimura et al. | ............. | 310/64 |
| 2011/0181137 A1* | 7/2011 | Kori et al. | ........................ | 310/59 |
| 2012/0248908 A1* | 10/2012 | Zahora et al. | .................... | 310/62 |

FOREIGN PATENT DOCUMENTS

| | | | | | |
|---|---|---|---|---|---|
| JP | 55077351 A | * | 6/1980 | | |
| JP | 57006553 A | * | 1/1982 | | |
| JP | 06169554 A | * | 6/1994 | ............... | H02K 9/06 |

* cited by examiner

*Primary Examiner* — Alex W Mok
(74) *Attorney, Agent, or Firm* — Kinney & Lange, P.A.

(57) ABSTRACT

A fully enclosed fan motor assembly includes a motor housing. A stator is located radially inward from the motor housing. A rotor is located radially inward from the stator, and the gap in between the rotor and stator defines a rotor stator gap. A shaft is located radially inward from the rotor. A fin portion extending radially outward from the shaft is used to dissipate heat from the rotor to air drawn through the rotor stator gap and over the fin portion.

10 Claims, 4 Drawing Sheets

ENHANCED COOLING OF ENCLOSED AIR COOLED HIGH POWER MOTORS

BACKGROUND

The present invention relates to fan motors, and in particular, to a method of cooling fan motors.

A fan motor includes a stator and a rotor. Heat generated by fan motor operation is traditionally controlled by drawing air from outside the motor to cool the internal components. One method for controlling generated heat is by drawing air through a hollow core shaft to dissipate heat from the shaft to the passing air. Another method draws fresh air from outside the motor and pushes the air through the rotor stator gap. In an additional method, air is drawn through holes in the motor rotor laminations to dissipate heat. Increases in loads and desired power increases heat produced by the motor and therefore require improved methods and structures for removing heat.

Totally enclosed high power induction or permanent magnet motors used in aircraft fan applications are internal convection cooled. Due to higher power dissipated in new generation of such motors, cooling of the rotor is often challenging, resulting in use of expensive copper rotors, or use of hollow shafts with expensive brazed heat exchangers for cooling such rotors.

SUMMARY

A fan motor assembly comprises a motor housing, a stator, a rotor, a shaft, and a heat exchanger. The stator is located radially inward from the motor housing. The rotor is located radially inward from the stator, and the space between the rotor and stator defining a rotor stator gap. The shaft is located radially inward from and is connected to the rotor. A heat exchanger is mounted on the shaft and extends radially outward form the shaft to transfer heat from the shaft to air drawn through the rotor stator gap.

Another embodiment is a fan motor assembly which includes a fan casing. A fan impeller is located in an upstream portion of the fan casing. A motor housing is mounted in the fan casing. Fan stator vanes are mounted on the motor housing and extend radially from the housing. A stator is located radially inward from the stator. The stator and the rotor define a rotor stator gap between them. A shaft is located radially inward from the rotor, and the shaft is connected to the rotor. A heat exchanger is mounted on and extends radially outward from the shaft. The heat exchanger is positioned to transfer heat to air drawn through the rotor stator gap.

DETAILED DESCRIPTION

In this description several methods of cooling such motor are disclosed. These cooling methods utilize the temperature gradient from the rotor to the stator housing surfaces as the driving temperature gradient to remove and dissipate heat from the motor rotor. In this manner of cooling, totally enclosed motors can be cooled very efficiently. Expensive copper rotors and brazed rotor heat exchangers can be eliminated.

Figure 1:
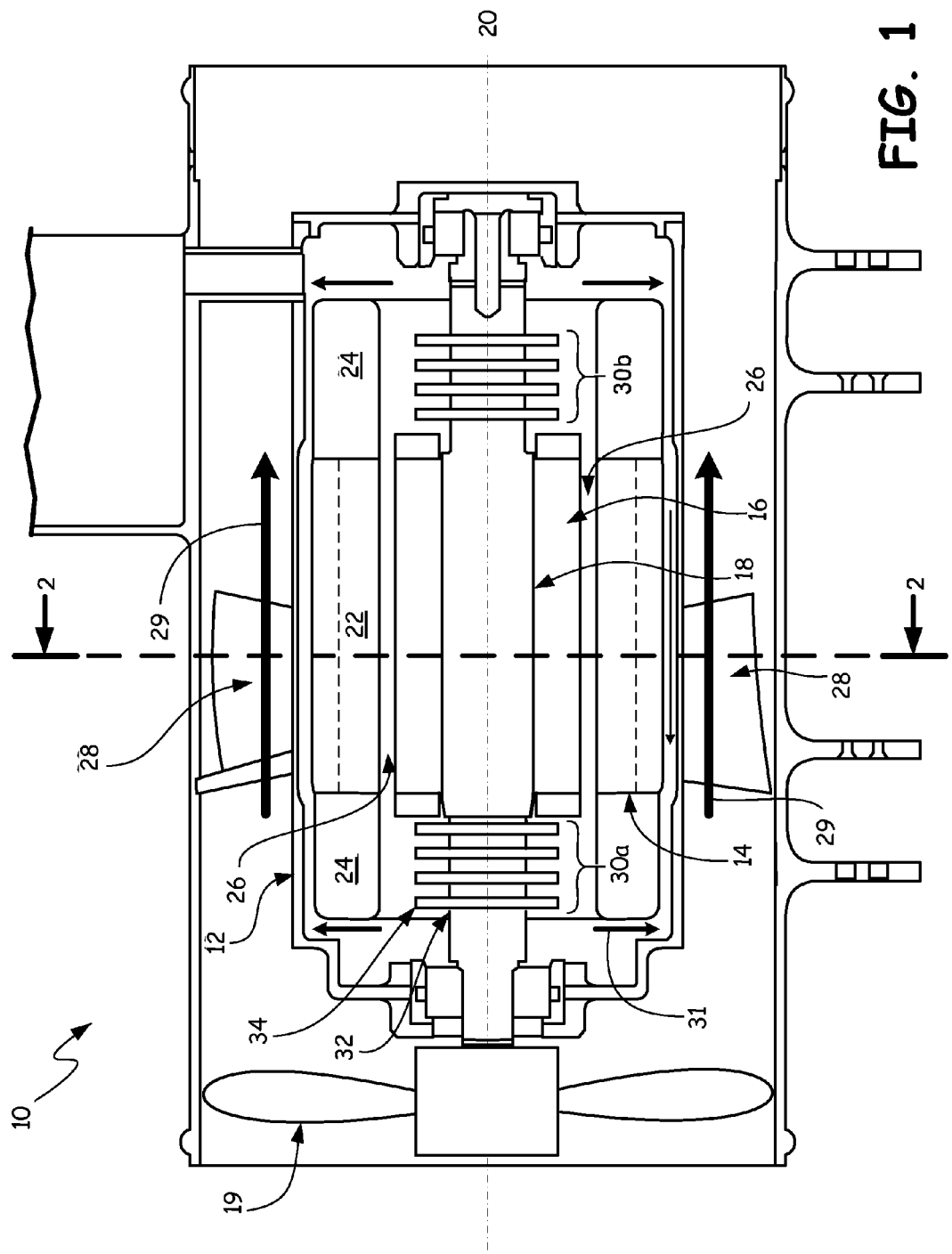
FIG. 1 is a cross-sectional view of a fan motor assembly according to a first embodiment of the present invention.

FIG. 1 is a cross-sectional view of fan motor assembly 10 according to a first embodiment of the present invention. FIG. 1 illustrates fan motor assembly 10 which includes motor housing 12, stator 14, rotor 16, and shaft 18. Within the motor assembly 10, rotor 16 is mounted to shaft 18. Stator 14 defines an inner space within which rotor 16 and shaft 18 rotate about axis 20. The rotation of rotor 16 relative to the stationary stator 14 creates an inductive motor function. Stator 14 is spaced radially outward from rotor 16 such that rotor stator gap 26 is between rotor 16 and stator 14. Stator 14 includes stator core 22 and a plurality of stator windings 24. Fan impeller 19 is mounted on shaft 18 and rotates to produce a main fan flow 29. Fan stator vanes 28 are disposed radially outward from motor housing 12. Fan stator vanes 28 direct main fan flow 29 through fan motor assembly 10 and along the radial exterior of motor casing 12.

Due to the relatively fast rotation rates of rotor 16, overheating of fan motor assembly 10 can become a problem. In order to cool fan motor assembly 10, heat from rotor 16 is dissipated into passing air 31 located in rotor stator gap 26. Heat from passing air 31 in rotor stator gap 26 is transferred to stator 14. Heat from stator 14 is conducted to motor housing 12 where the heat is dissipated by main fan flow 29 being drawn across motor housing 12.

A multiple of annular heat-radiating fins 30 are mounted on an outer peripheral surface of shaft 18 axially parallel to each other at regular intervals. Fins 30 are arranged such that their major surfaces are arranged perpendicular to axis 20 of shaft 18 so as not to serve as fans. Fins 30 provide increased surface area (e.g., compared to a cylindrical, smooth surface) from which shaft 18 emits heat into passing air 31. Fins 30 extend radially outward from an outer diameter of shaft 18. Fins 30 each include fin base 32 and fin end 34. In FIG. 1, fin ends 34 have a square profile, however, fin end 34 profiles may alternatively be rounded, tapered, or other shape to achieve a desired cooling effect as described below. A first portion of fins 30a are disposed on an upstream segment of shaft 18 and a second portion of fins 30b are disposed on a downstream portion of shaft 18.

Fins 30 function to cool fan motor assembly 10 by dissipating heat from shaft 18 to passing air 31. Passing air 31 is drawn over the surface of fins 30 and heat is dissipated from fins 30 into passing air 31. By providing an increased surface area of shaft 18, fins 30 increase the rate of heat dissipation from shaft 18 to passing air 31. Fins 30 can be formed integrally with shaft 18, such as by machining. Alternatively, fins 30 are formed separately by forming cylindrical laminations and then brazing to shaft 18. If formed separately, fins 30 can be of the same material as shaft 18 or may alternatively be manufactured of a material different than shaft 18. This provides a benefit of selecting a material that has particularly tailored heat transfer properties, such as a material with a relatively high thermal conductivity.

Figure 2:
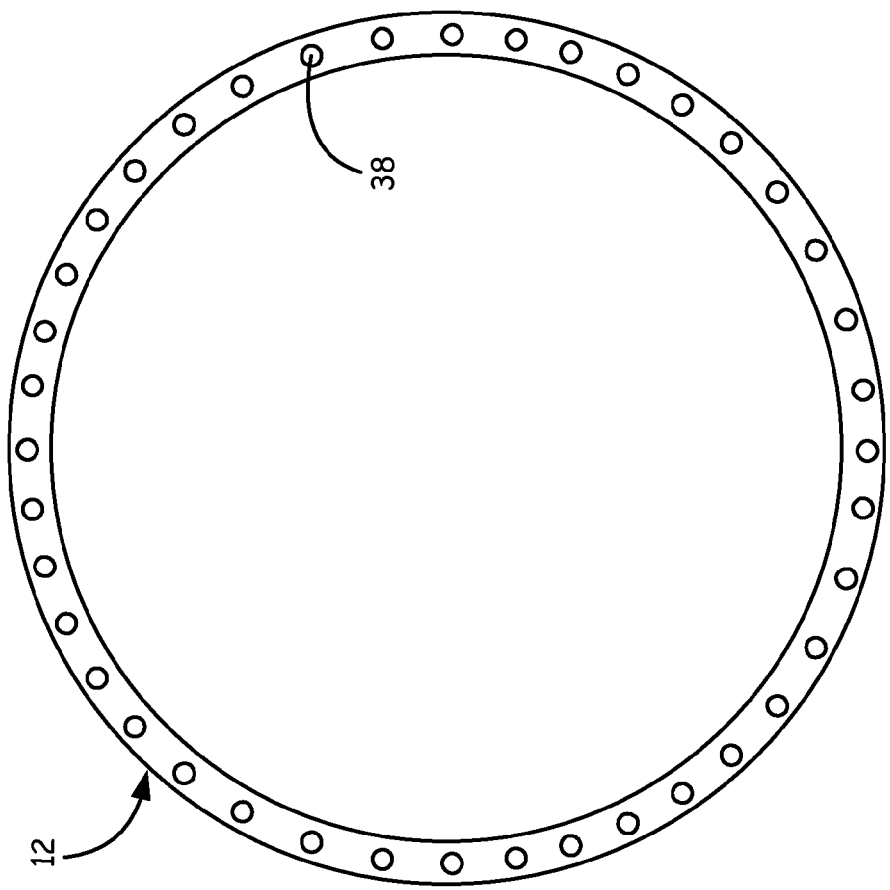
FIG. 2 is a cross-sectional view of a simplified line drawing of the motor housing shown in FIG. 1 taken along line 2-2 with cooling channels disposed in the motor housing according to a first embodiment of the present invention.

FIG. 2 is a cross-sectional view of a simplified line drawing of motor housing 12 taken along line 2-2 according to a first embodiment. Cooling channels 38 are disposed in motor housing 12. Cooling channels 38 run in an axial direction and parallel to axis 20. Cooling channels 38 provide a heat exchanging function providing for removal of heat created during motor operation.

Figure 3:
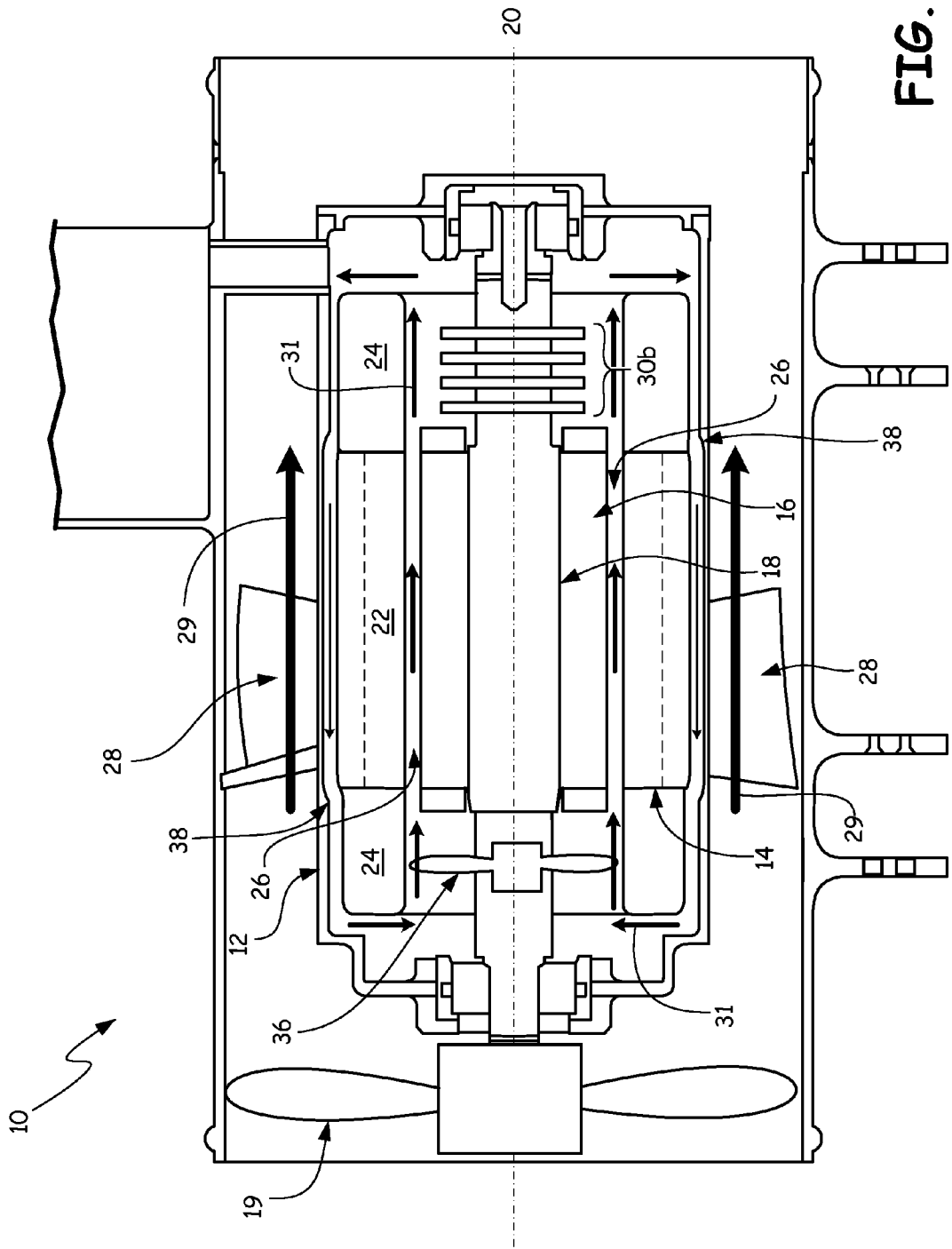
FIG. 3 is a cross-sectional view of a fan motor assembly according to a second embodiment of the present invention.

FIG. 3 is a cross-sectional view of fan motor assembly 10 according to a second embodiment of the present invention. Shaft 18 includes impeller 36 disposed on an upstream end of shaft 18. Impeller 36 is driven by shaft 18. Fins 30b are disposed on a downstream portion of shaft 18. Fins 30b provide an increased surface area from which heat is dissipated from shaft 18 and rotor 16. Impeller 36 pushes passing air 31 through rotor stator gap 26 and across fins 30b resulting in cooling of shaft 18 and rotor 16 through heat exchange. By pushing the passing air through rotor stator gap 26, impeller 36 increases the rate of air flow of passing air 31 throughout fan motor casing assembly 10. Passing air 31 is then directed to cooling channels 38 in fan motor housing 12. An increased rate of air flow throughout fan motor casing 10 causes an increase in the amount of passing air 31 that is conductively cooled by main fan flow 29 and motor casing 12. The resulting increase in cooling rate of passing air 31 causes fan motor assembly 10 to be cooled at an increased rate.

Cooling channels extend the length of motor housing 12 in a direction parallel to axis 20. Cooling channels 38 are fluidly connected to rotor stator gap 26. Passing air 31 drawn through rotor stator gap 26 is heated as heat is dissipated from rotor 16 and shaft 18 to passing air 31. Passing air 31 is then directed to cooling channels 38 in motor housing 12. Cooling channels 38 conduct a heat exchanging function providing for removal of heat created during motor operation. Heat from passing air 31 generated during operation is removed by main fan flow 29 over the outer surface of motor housing 12. Passing air 31 from rotor stator gap 26 is directed through cooling channels 38 in an upstream direction to be conductively cooled by main fan flow 29. Main fan flow 29 consists of cold exterior air from outside of fan motor assembly 10, and as the cold main fan flow 29 is drawn over motor housing 12, heat is absorbed by main fan flow 29 from motor housing 12. As energy is drawn from motor housing 12 into main fan flow 29, passing air 31 is conductively cooled and is redirected to flow back through rotor stator gap 26 to begin a heat dissipating cycle over again.

Figure 4:
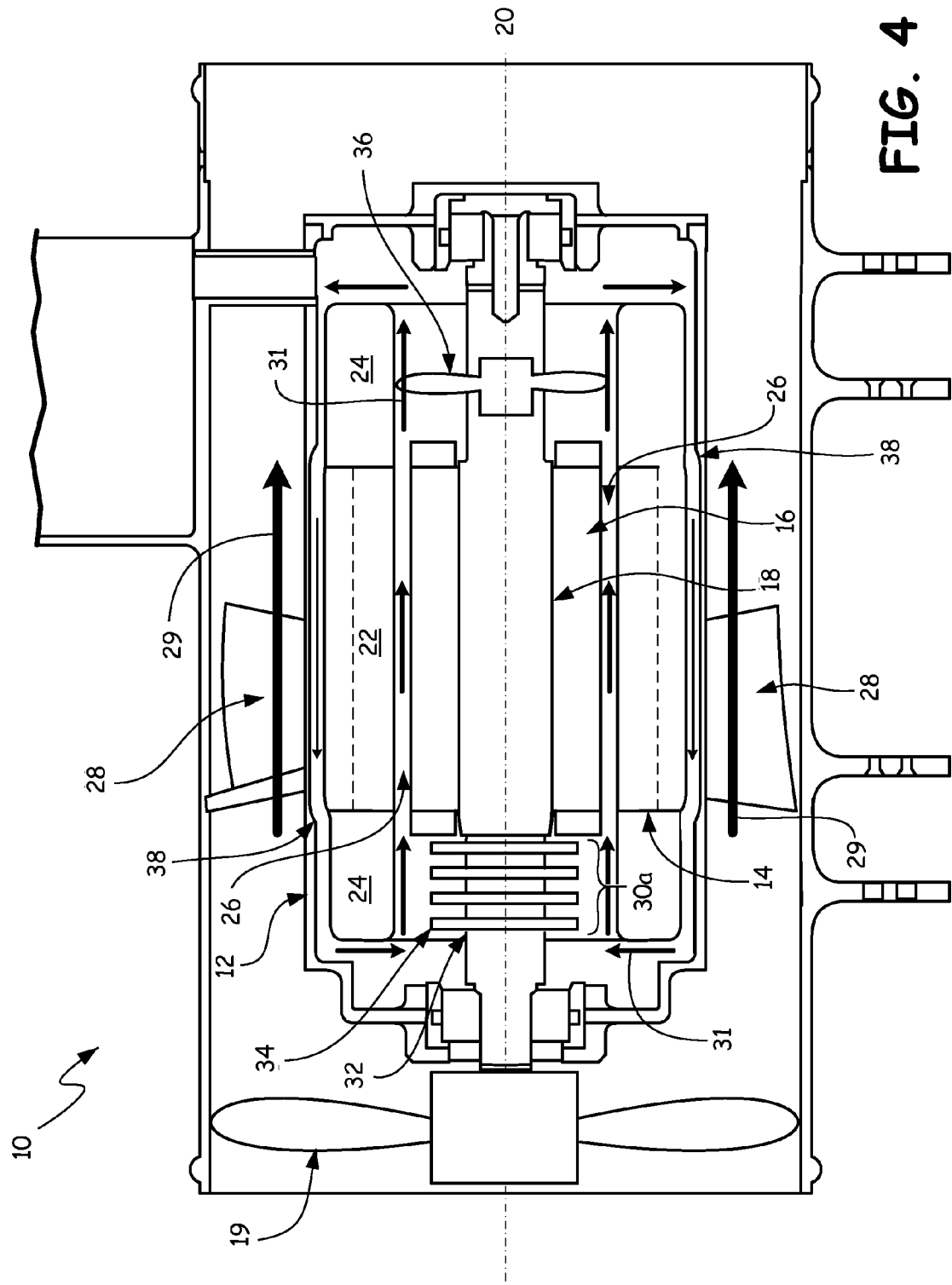
FIG. 4 is a cross-sectional view of a fan motor assembly according to a third embodiment of the present invention.

FIG. 4 is a cross-sectional view of a fan motor assembly 10 according to a third embodiment of the present invention. Shaft 18 includes impeller 36 disposed on a downstream end of shaft 18. Impeller 36 is driven by shaft 18. Fins 30a are disposed on an upstream portion of shaft 18. Fins 30a provide an increased surface area from which heat is dissipated from shaft 18 and rotor 16. Impeller 36 pull passing air 31 across fins 30a and through rotor stator gap 26 resulting in cooling of shaft 18 and rotor 16 through heat exchange. By pulling passing air 31 through rotor stator gap 26, impeller 36 increases the rate of air flow of passing air 31 throughout fan motor casing assembly 10. Passing air 31 is then directed to cooling channels 38 in fan motor housing 12. An increased rate of air flow throughout fan motor casing 10 causes an increase in the amount of passing air 31 that is conductively cooled by main fan flow 29 and motor casing 12. This combination of shaft 18, fins 30a, impeller 36, and cooling channels 38 will provide the maximum cooling for fan motor assembly 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fan motor assembly comprising:
   a motor housing,
   a stator located radially inward from the motor housing;
   a rotor located radially inward from the stator, the stator and the rotor defining a rotor stator gap there between, wherein air is drawn through the rotor stator gap;
   a shaft located radially inward from and connected to the rotor;
   a heat exchanger mounted on, connected directly to, and extending radially outward from the shaft, the heat exchanger is configured to transfer heat from the heat exchanger to the air drawn through the rotor stator gap; and
   a plurality of cooling channels disposed between a radially outer surface of the motor housing and a radially inner surface of the motor housing, the cooling channels extending in an axial direction parallel to the shaft, wherein the cooling channels are fluidly connected to the rotor stator gap.

2. The fan motor assembly of claim 1, wherein heat exchanger comprises at least one fin.

3. The fan motor assembly of claim 2, wherein the at least one fin extends radially outward in a direction generally perpendicular to the shaft.

4. The fan motor assembly of claim 3, wherein the at least one fin is disposed on a first end of the shaft upstream from the rotor.

5. The fan motor assembly of claim 3, wherein the at least one fin is disposed on a second end of the shaft downstream from the rotor.

6. The fan motor assembly of claim 1, wherein an impeller is disposed on a portion of the shaft upstream from the rotor.

7. The fan motor assembly of claim 1, wherein an impeller is disposed on a portion of the shaft downstream from the rotor.

8. The fan motor assembly of claim 1, wherein the cooling channels function as heat exchangers for air drawn through the rotor stator gap, whereby the air drawn through the rotor stator gap is cooled by a main fan air flow over the outer surface of the motor housing.

9. The fan motor assembly of claim 1, wherein the fan motor assembly is totally enclosed.

10. A system comprising:
    a fan casing;
    a fan impeller located in an upstream portion of the fan casing; and
    a fan motor assembly according to claim 1.

* * * * *